No. 761,044. PATENTED MAY 24, 1904.
V. M. GEORGE.
METHOD OF PURIFYING WATER.
APPLICATION FILED JAN. 8, 1904.
NO MODEL.
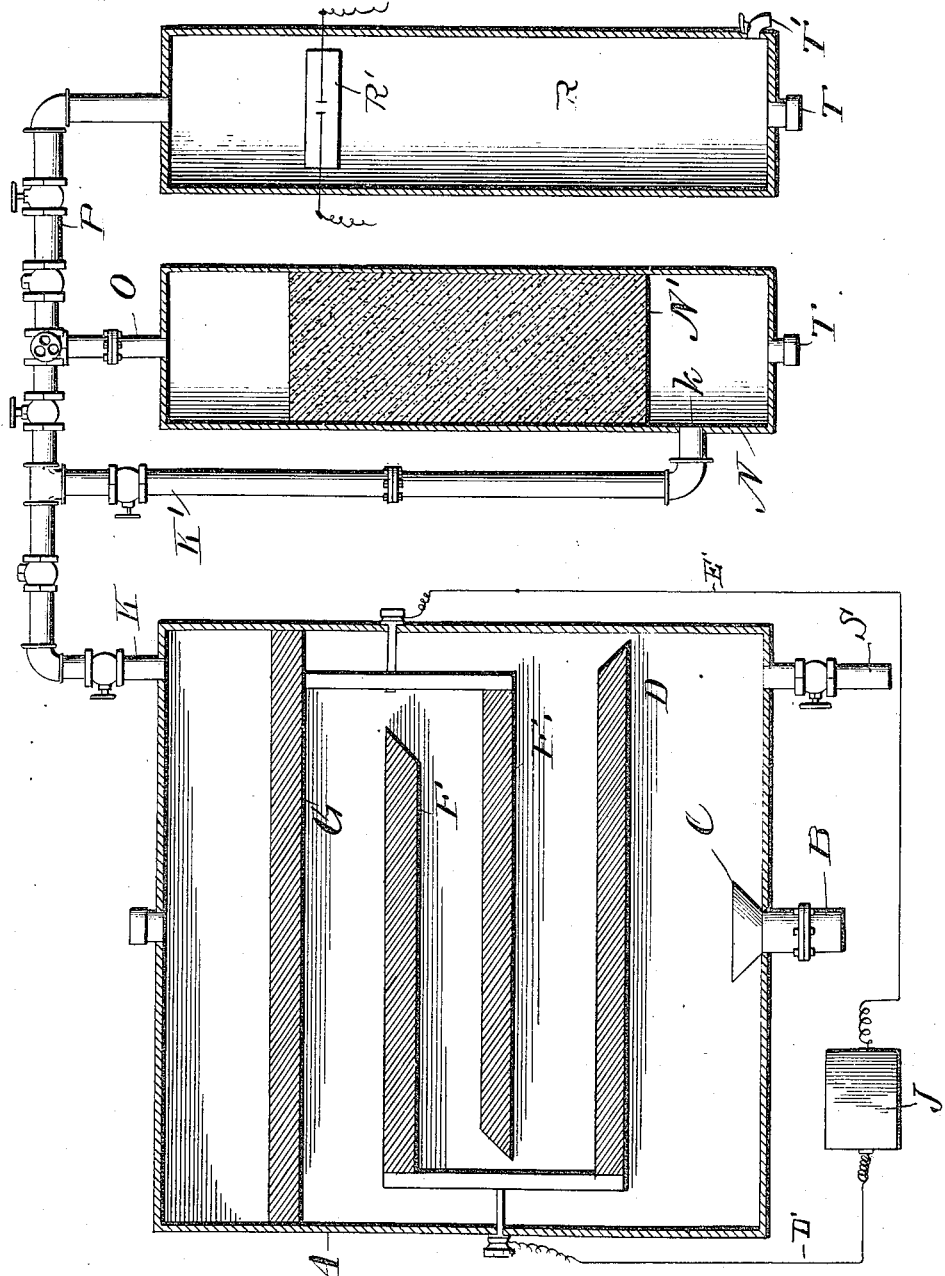
WITNESSES:
Wm. F. Doyle.
A. L. Hough
INVENTOR
Virgil M. George,
By Franklin H. Hough
Attorney No. 761,044.    Patented May 24, 1904.

UNITED STATES PATENT OFFICE.

VIRGIL M. GEORGE, OF YOUNGSTOWN, OHIO.

METHOD OF PURIFYING WATER.

SPECIFICATION forming part of Letters Patent No. 761,044, dated May 24, 1904.

Application filed January 8, 1904. Serial No. 188,212. (No specimens.)

*To all whom it may concern:*

Be it known that I, VIRGIL M. GEORGE, a citizen of the United States, residing at Youngstown, in the county of Mahoning and State of Ohio, have invented certain new and useful Improvements in Methods of Purifying Water; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention relates to new and useful methods of treating water, milk, beer, whisky, or other liquids whereby all germ life and filth may be eliminated therefrom; and it consists of introducing the liquid under pressure into a receptacle in which are located electrodes of carbon, zinc, aluminium, and copper which are thrown into action automatically as the water or other liquid is turned into the receptacle and the passage of the same after being treated by the electrodes for the purpose of destroying the germ life into a separator-tank, where any filth which may be carried from the first receptacle may be filtered before the liquid passes into a third tank, where it is treated by ozone, the last step in the process of its purification, preparing the same for drinking purposes.

An apparatus whereby the various steps of my process may be carried out is illustrated in the accompanying drawing, in which I have shown a vertical sectional view through the same.

Reference now being had to the details of the drawing by letter, A designates a receptacle containing an electrolytic purifier, through the bottom of which a service-pipe B leads, which when adapted for use in treating water is adapted to be connected to the water-main and to supply water under pressure to the receptacle. At the outlet end of the pipe B and inside the receptacle A is a funnel-shaped member C, and positioned also within the receptacle are four plates nearly square or rectangular in outline and designated by letters D, E, F, and G. The first of said plates D is made, preferably, of copper, which when acted upon with one amperage intensifies the electric current, which then passes to aluminium-nickel alloy E, which is electrically connected, by means of a wire E', with a cathode or negative pole of any suitable electric generator J, while a wire D', electrically connected with the plates D and F, also has electrical connection with the positive pole of said generator, the cathode, or negative pole of the ozone-generator, (designated by letter R',) whereby the organic matter in the water may be precipitated. The water then comes in contact with the plate F, made, preferably, of zinc, and precipitates the inorganic matter, thence in contact with the plate G of carbon for purifying the same. Said plate G extends from side to side of the receptacle A and acts as a filter-plate, serving to catch whatever matter passes over the other plates, and throws back precipitations upon the under plates, which have an affinity therefor, the refuse being flushed off through the exit-pipe S. After the water or other liquid which is forced by pressure from the pipe B passes in contact with the various plates described it is sufficiently purified to pass from the electrolytic purifier through the pipes K and K' and enters the lower part of the separator-tank N through the exit end of the pipe $k$ underneath the screen N' in said tank. I place within the tank N and upon the close-wire screen N' a supply of suitable filtering material, preferably tripoli, for the purpose of filtering out any dead matter which may be carried by the pressure of the water from the electrolytic purifier which may pass through said carbon plate into the tank N. Leading from the pipe O is a pipe P, which opens into a third receptacle or tank R, in which the water after being acted upon by the electrolytic purifier is ozonated, after which the water is ready for use. Suspended within the tank R is an ozone-generator R', made of any suitable material, which is adapted to have electrical connections with any suitable source of supply having a voltage, preferably, from one to two hundred. The ozone-tank is provided with a flushing-plug T in the bottom and a spigot T', through which the water may be drawn from the tank R.

The treatment of water or other liquids by my method through the instrumentality of the apparatus disclosed by the drawing is simple, and liquid introduced under pressure through the service-pipe into the electrolytic purifier and deflected by the funnel-shaped exit against the various plates, which are energized and adapted to be turned on automatically by any suitable switch (not shown) as the liquid is let into the purifier, will be electrolyzed and the germ life therein killed.

The action of the various plates upon the water or other liquid as it circulates about the same destroys the germ life which adheres to or precipitates upon the plates, and the liquid passing into the separator is relieved of any filth which may be carried from the electrolytic purifier into the separator by the pressure of the liquid. After the liquid passes through the separator it is directed to the ozone-tank, where it is acted upon by ozone, and in the treatment of the same from the moment it enters the electrolytic purifier until it is drawn from the spigot T' it is not in any way vitiated by contact with the germs of the atmosphere and may be drawn off chemically pure.

While I have shown a particular form of apparatus whereby the steps of my process may be carried out, it will be understood that any apparatus may be employed, if desired, without in any way departing from the spirit of the invention.

Having thus fully described my invention, what I claim as new, and desire to secure by Letters Patent, is—

1. A method of treating water or other liquids consisting in introducing the same under pressure into a receptacle, and causing same to be acted upon by energized electrodes of different metals, and afterward subjecting the liquid thus treated to the action of ozone produced by subjecting the liquid to a current of sufficient voltage, as set forth.

2. A method of treating water or other liquids consisting in introducing the same under pressure into a receptacle, and causing same to be acted upon by energized electrodes of different metals, and purifying the liquid by its being forced through carbon and afterward treating the same by the action of ozone produced by subjecting the liquid to a current of sufficient voltage, as set forth.

3. A method of treating water or other liquids consisting in introducing the same under pressure into a receptacle, and causing same to be acted upon by energized electrodes of different metals and purifying the liquid by its being forced through carbon, then forcing the liquid thus treated, through a separator, and finally introducing the liquid in a separate receptacle to the action of ozone produced by subjecting the liquid to a current of sufficient voltage, as set forth.

In testimony whereof I hereunto affix my signature in presence of two witnesses.

VIRGIL M. GEORGE.

Witnesses:
ANTHONY B. CALVIN,
JOHN R. ROSS.